US009705840B2

(12) United States Patent
Pujare et al.

(10) Patent No.: US 9,705,840 B2
(45) Date of Patent: Jul. 11, 2017

(54) AUTOMATION PLATFORM FOR HUB-BASED SYSTEM FEDERATING DISPARATE UNIFIED COMMUNICATIONS SYSTEMS

(71) Applicant: NextPlane, Inc., Sunnyvale, CA (US)

(72) Inventors: Sanjay Pujare, San Jose, CA (US); Saravanan Bellan, San Jose, CA (US); Silvia Restelli, San Jose, CA (US); Yogesh Raina, Cupertino, CA (US); Farzin Shahidi, Los Altos Hills, CA (US)

( * ) Notice: Subject to any disclaimer, the term of this patent is extended or adjusted under 35 U.S.C. 154(b) by 489 days.

(21) Appl. No.: 13/909,032

(22) Filed: Jun. 3, 2013

(65) Prior Publication Data

US 2014/0359027 A1 Dec. 4, 2014

(51) Int. Cl.
*G06F 15/16* (2006.01)
*H04L 12/58* (2006.01)
*H04L 29/06* (2006.01)

(52) U.S. Cl.
CPC .............. *H04L 51/36* (2013.01); *H04L 51/04* (2013.01); *H04L 69/08* (2013.01)

(58) Field of Classification Search
CPC .......... H04L 51/36; H04L 51/04; H04L 69/08
See application file for complete search history.

(56) References Cited

U.S. PATENT DOCUMENTS

| 5,784,612 A | 7/1998 | Crane |
| 6,041,281 A | 3/2000 | Nimura et al. |
| 6,065,016 A | 5/2000 | Stuntebeck et al. |
| 6,192,405 B1 | 2/2001 | Bunnell |
| 6,208,986 B1 | 3/2001 | Schneck et al. |
| 6,298,128 B1 | 10/2001 | Ramey et al. |
| 6,418,200 B1 | 7/2002 | Ciccolella et al. |
| 6,463,056 B1 | 10/2002 | Silva et al. |

(Continued)

FOREIGN PATENT DOCUMENTS

| EP | 1549024 A1 | 6/2005 |
| WO | WO02/039237 * | 5/2002 |
| WO | 2015/054522 A1 | 4/2015 |

OTHER PUBLICATIONS

Bossoli, Francesca, et al.; "Proposal for Common Interoperability Protocol", Online, Aug. 30, 2003, pp. 1-3, XP002283230.

(Continued)

*Primary Examiner* — Yves Dalencourt
(74) *Attorney, Agent, or Firm* — Steptoe & Johnson LLP

(57) ABSTRACT

An automation platform for a hub-based system federating disparate unified communications systems is provided. According to one embodiment, the method includes connecting a first unified communications system supporting a first domain and an automation platform to a federation server, where the automation platform includes a plurality of automated applications that includes a social media automated application, an instant messaging automated application and a directory search automated application. The method further includes routing a message from the first unified communications system to an automated application of the plurality of automated applications, processing the message by the automated application, and issuing a command based on the processed message.

26 Claims, 11 Drawing Sheets

(56) References Cited

U.S. PATENT DOCUMENTS

| | | | |
|---|---|---|---|
| 6,591,291 B1 | 7/2003 | Gabber et al. | |
| 6,654,759 B1 | 11/2003 | Brunet et al. | |
| 6,665,378 B1 | 12/2003 | Spielman et al. | |
| 6,738,462 B1 | 5/2004 | Brunson | |
| 6,892,245 B1* | 5/2005 | Crump et al. | 709/245 |
| 6,970,553 B1 | 11/2005 | Gao | |
| 7,051,114 B1 | 5/2006 | Ravishankar et al. | |
| 7,269,432 B2 | 9/2007 | Gress | |
| 7,350,229 B1 | 3/2008 | Lander | |
| 7,376,827 B1 | 5/2008 | Jiao | |
| 7,383,436 B2 | 6/2008 | Srivastava | |
| 7,443,961 B2 | 10/2008 | Schroeder et al. | |
| 7,558,827 B2 | 7/2009 | Kawashima et al. | |
| 7,577,132 B2 | 8/2009 | Katz et al. | |
| 7,697,924 B2 | 4/2010 | Caspi et al. | |
| 7,698,398 B1 | 4/2010 | Lai | |
| 7,706,266 B2 | 4/2010 | Plamondon | |
| 7,739,333 B2 | 6/2010 | Serr et al. | |
| 7,953,979 B2 | 5/2011 | Borneman et al. | |
| 8,145,719 B2 | 3/2012 | Barman | |
| 8,200,758 B2 | 6/2012 | Serr | |
| 8,359,357 B2 | 1/2013 | Rodriguez et al. | |
| 8,380,661 B2 | 2/2013 | Richards et al. | |
| 9,077,726 B2 | 7/2015 | Pujare | |
| 9,203,799 B2 | 12/2015 | Bellan | |
| 9,241,012 B2* | 1/2016 | de Castro, Jr. | H04L 65/1043 |
| 2002/0037074 A1 | 3/2002 | Dowens et al. | |
| 2002/0083183 A1 | 6/2002 | Pujare et al. | |
| 2002/0087704 A1 | 7/2002 | Chesnais et al. | |
| 2002/0124057 A1 | 9/2002 | Besprosvan | |
| 2002/0147927 A1 | 10/2002 | Tait | |
| 2002/0157089 A1 | 10/2002 | Patel et al. | |
| 2003/0018725 A1* | 1/2003 | Turner et al. | 709/206 |
| 2003/0149781 A1 | 8/2003 | Yared et al. | |
| 2004/0083297 A1 | 4/2004 | Gazzetta et al. | |
| 2004/0098615 A1 | 5/2004 | Mowers | |
| 2005/0022006 A1* | 1/2005 | Bass et al. | 713/201 |
| 2005/0047238 A1 | 3/2005 | Sylvain | |
| 2005/0047438 A1 | 3/2005 | Sylvain | |
| 2005/0097317 A1 | 5/2005 | Trostle | |
| 2005/0102513 A1 | 5/2005 | Alvie | |
| 2005/0175021 A1 | 8/2005 | Ozugur et al. | |
| 2005/0288961 A1 | 12/2005 | Tabrizi | |
| 2006/0021017 A1 | 1/2006 | Hinton et al. | |
| 2006/0021019 A1 | 1/2006 | Hinton et al. | |
| 2006/0075506 A1 | 4/2006 | Sanda | |
| 2006/0120362 A1 | 6/2006 | Westman | |
| 2006/0128409 A1 | 6/2006 | Gress et al. | |
| 2006/0136990 A1 | 6/2006 | Hinton et al. | |
| 2006/0205434 A1 | 9/2006 | Tom et al. | |
| 2006/0230124 A1 | 10/2006 | Belfiore et al. | |
| 2007/0011245 A1 | 1/2007 | Kawashima et al. | |
| 2007/0130343 A1 | 6/2007 | Pardo-Blazquez et al. | |
| 2007/0136603 A1 | 6/2007 | Kuecuekyan | |
| 2007/0202897 A1* | 8/2007 | Smith | 455/466 |
| 2007/0234417 A1 | 10/2007 | Blakley, III | |
| 2007/0285503 A1 | 12/2007 | Asthana et al. | |
| 2008/0010665 A1 | 1/2008 | Hinton et al. | |
| 2008/0021997 A1 | 1/2008 | Hinton | |
| 2008/0032695 A1 | 2/2008 | Zhu | |
| 2008/0072301 A1 | 3/2008 | Chia et al. | |
| 2008/0082662 A1 | 4/2008 | Dandliker et al. | |
| 2008/0086564 A1 | 4/2008 | Putman et al. | |
| 2008/0144896 A1 | 6/2008 | Burke | |
| 2008/0215694 A1 | 9/2008 | Chen et al. | |
| 2008/0215717 A1 | 9/2008 | Zhou et al. | |
| 2008/0219223 A1 | 9/2008 | Bienas | |
| 2008/0320576 A1 | 12/2008 | Curling | |
| 2009/0006076 A1 | 1/2009 | Jindal | |
| 2009/0019115 A1 | 1/2009 | Larson et al. | |
| 2009/0019367 A1 | 1/2009 | Cavagnari et al. | |
| 2009/0049190 A1 | 2/2009 | Jiang et al. | |
| 2009/0049202 A1 | 2/2009 | Pattison | |
| 2009/0077251 A1 | 3/2009 | Brown et al. | |
| 2009/0089625 A1 | 4/2009 | Kannappan et al. | |
| 2009/0094336 A1 | 4/2009 | Echevarria et al. | |
| 2009/0100289 A1 | 4/2009 | Chen | |
| 2009/0119763 A1 | 5/2009 | Park et al. | |
| 2009/0138615 A1* | 5/2009 | Cristallo et al. | 709/235 |
| 2009/0150905 A1 | 6/2009 | Lin et al. | |
| 2009/0172776 A1 | 7/2009 | Makagon et al. | |
| 2009/0177735 A1 | 7/2009 | Algie et al. | |
| 2009/0180602 A1 | 7/2009 | Ramanathan et al. | |
| 2009/0210496 A1 | 8/2009 | Shaffer | |
| 2009/0276840 A1 | 11/2009 | Cao et al. | |
| 2009/0292814 A1 | 11/2009 | Ting et al. | |
| 2009/0307327 A1 | 12/2009 | Malik et al. | |
| 2009/0319672 A1 | 12/2009 | Reisman | |
| 2009/0327419 A1 | 12/2009 | Serr | |
| 2009/0327441 A1 | 12/2009 | Lee | |
| 2009/0327868 A1 | 12/2009 | Tsukikawa | |
| 2010/0017598 A1 | 1/2010 | Rodriguez et al. | |
| 2010/0057851 A1 | 3/2010 | Ionescu et al. | |
| 2010/0058120 A1 | 3/2010 | Coleman et al. | |
| 2010/0100925 A1 | 4/2010 | Hinton | |
| 2010/0162374 A1 | 6/2010 | Nair | |
| 2010/0205664 A1 | 8/2010 | Serr et al. | |
| 2010/0223334 A1 | 9/2010 | Narayanan | |
| 2010/0251158 A1* | 9/2010 | Geppert et al. | 715/771 |
| 2010/0287226 A1 | 11/2010 | Wright et al. | |
| 2010/0290611 A1 | 11/2010 | Ramanathan et al. | |
| 2011/0035443 A1 | 2/2011 | Jensen | |
| 2011/0179180 A1 | 7/2011 | Schleifer | |
| 2011/0231473 A1 | 9/2011 | Narayanan et al. | |
| 2011/0231919 A1 | 9/2011 | Vangpat et al. | |
| 2011/0238761 A1 | 9/2011 | Mizokami | |
| 2011/0271332 A1 | 11/2011 | Jones | |
| 2011/0314014 A1 | 12/2011 | Junginger et al. | |
| 2012/0008753 A1 | 1/2012 | Burnett et al. | |
| 2012/0036566 A1 | 2/2012 | Nicholson | |
| 2012/0084254 A1 | 4/2012 | Richards et al. | |
| 2012/0096271 A1 | 4/2012 | Ramarathinam et al. | |
| 2012/0163577 A1 | 6/2012 | Buford | |
| 2012/0180105 A1 | 7/2012 | Downes et al. | |
| 2012/0185391 A1 | 7/2012 | Sirota | |
| 2012/0190325 A1 | 7/2012 | Abu-Hakima et al. | |
| 2012/0203913 A1 | 8/2012 | Pujare et al. | |
| 2012/0216267 A1 | 8/2012 | Austel et al. | |
| 2012/0216268 A1 | 8/2012 | Kassaei et al. | |
| 2012/0254326 A1 | 10/2012 | Bellan et al. | |
| 2012/0254373 A1 | 10/2012 | Pujare et al. | |
| 2012/0274725 A1 | 11/2012 | Robertson | |
| 2012/0314635 A1 | 12/2012 | Lee | |
| 2013/0007150 A1 | 1/2013 | Hertz et al. | |
| 2013/0065618 A1 | 3/2013 | Long | |
| 2013/0066871 A1 | 3/2013 | Fletcher | |
| 2013/0132285 A1 | 5/2013 | Richards et al. | |
| 2013/0151709 A1 | 6/2013 | Luna | |
| 2013/0160105 A1 | 6/2013 | Huang et al. | |
| 2013/0198386 A1 | 8/2013 | Srikanth et al. | |
| 2013/0246640 A1 | 9/2013 | Ahrens | |
| 2013/0254847 A1 | 9/2013 | Adams et al. | |
| 2013/0268920 A1 | 10/2013 | Ursal et al. | |
| 2014/0089348 A1 | 3/2014 | Vollmert | |
| 2014/0148934 A1 | 5/2014 | Manley et al. | |
| 2014/0181255 A1 | 6/2014 | Thomas | |
| 2014/0280931 A1 | 9/2014 | Braun et al. | |
| 2014/0280932 A1 | 9/2014 | Braun et al. | |
| 2014/0282816 A1 | 9/2014 | Xie | |
| 2014/0282934 A1 | 9/2014 | Miasnik et al. | |
| 2014/0289303 A1 | 9/2014 | Tarricone et al. | |
| 2014/0337954 A1 | 11/2014 | Ahmed et al. | |
| 2014/0359027 A1 | 12/2014 | Pujare et al. | |
| 2015/0039700 A1 | 2/2015 | West et al. | |
| 2015/0074788 A1 | 3/2015 | Wang | |
| 2015/0237041 A1 | 8/2015 | Flamini et al. | |

OTHER PUBLICATIONS

"Nimsoft® Monitor™ Server, Getting Started Guide version 6.00" (Jun. 29, 2012 to Nimsoft), 46 pages.

(56) References Cited

OTHER PUBLICATIONS

"Office-LinX Cloud Connect Edition for Cisco Unity Connection", Esna Technologies, Inc., Richmond Hill, ON, Canada © 2012, 2 pages.

Levy, Brian, "The common capability approach to new service development", BT Technology Journal, vol. 23, No. 1, Jan. 2005, pp. 48-54.

Microsoft Computer Dictionary, 5th Edition, Microsoft Press, Redmond, WA, (c) 2002, p. 16.

Microsoft Computer Dictionary, 5th Edition, Microsoft Press, Redmond, WA, (c) 2002, p. 474.

Bogusz, Dariusz, et al., "Telco 2.0 for UC—an example of integration telecommunications service provider's SDP with enterprise UC system", FedCSIS 2012, Wroclaw, Poland, Sep. 9-12, 2012, pp. 603-606.

Ennai, Anuraj, et al., "MobileSOA: A Service Oriented Web 2.0 Framework for Context-Aware, Lightweight and Flexible Mobile Applications", EDOCW 2008, Munich, Germany, Sep. 16, 2008, pp. 345-352.

Beuchelt, G., et al., "RESTful Services Guidance for Developers v 1.0", MITRE Technical Report MTR100093, Apr. 2010, 46 pages.

"Web Application Description Language", Wikipedia, downloaded from en.wikipedia.org/wiki/Web_Application_Description_Language on Feb. 2, 2015, pp. 1-3.

"Representational state transfer", Wikipedia, downloaded from en.wikipedia.org/wiki/Representational_state_transfer on Feb. 2, 2015, pp. 1-5.

"Cisco Unified Communications System Description Release 8.5(1)", Cisco Systems, Inc., San Jose, CA, (c) 2010, 90 pages.

Technical Specification "Interdomain Federation for IM and Presence Service on Cisco Unified Communications Manager, Release 9.0(1)", Cisco Systems, Inc., San Jose, CA, Jul. 18, 2012, 188 pages.

"Chapter 21—Voice Messaging, Cisco Unififed Communications System Description—Release 9.0 SRND, Cisco Systems", Inc., San Jose, CA, Apr. 30, 2013, 44 pages.

Supplementary European Search Report issued Aug. 20, 2014 in corresponding EP Application No. EP 11862613 filed Apr. 26, 2011, inventor Pujare, Sanjay et al.

PCT International Search Report issued Oct. 22, 2014 in corresponding PCT Application No. PCT/US2014/041595 filed Jun. 9, 2014, inventor Pujare, Sanjay et al.

PCT International Search Report issued Jan. 2, 2015 in corresponding PCT Application No. PCT/US2014/059944 filed Oct. 9, 2014, inventor Pujare, Sanjay et al.

PCT International Search Report issued May 23, 2012 in corresponding PCT Application No. PCT/US2012/024014 filed Feb. 6, 2012, inventor Pujare, Sanjay et al.

PCT International Search Report; Jul 8, 2011.

PCT International Search Report issued Apr. 6, 2015 in corresponding PCT Application No. PCT/US2014*049827 filed Aug. 5, 2014, inventor Pujare, Sanjay et al.

\* cited by examiner

AUTOMATION PLATFORM FOR HUB-BASED SYSTEM FEDERATING DISPARATE UNIFIED COMMUNICATIONS SYSTEMS

FIELD

The present system and method relate to unified communications (UC) systems. In particular, the present system and method relate to implementing an automation platform for a hub-based system federating disparate unified communications systems.

BACKGROUND

A unified communications (UC) system generally refers to a system that provides users with an integration of communication services. Users typically connect to the UC system through a single client to access the integrated communications services. The integrated communications services may include real-time services, such as instant messaging (IM), presence notifications, telephony, and video conferencing, as well as non real-time services, such as email, SMS, fax and voicemail.

Organizations, such as corporations, businesses, educational institutions, and government entities, often employ UC systems to enable internal communication among its members in a uniform and generally cost-efficient manner. In addition, organizations may employ UC systems for communicating with trusted external entities.

Currently, a number of third-party developers offer various UC applications for implementing UC systems. The various applications include MICROSOFT® LYNC® (previously Microsoft Office Communications Server (OCS)), IBM® SAMETIME® (ST), GOOGLE APPS®, and CISCO JABBER®. Because there is no industry standard regarding UC systems, issues of incompatibility arise when users from one UC system need to communicate with users from a different UC system.

Users of UC systems may wish to use an automated platform that includes automated applications (herein referred to as bots) to perform automated tasks on their behalf. These bots are able to perform tasks that are both simple and structurally repetitive, but at a much higher rate than that would be possible for a human.

A prior art method of implementing a bot application involves using a UC managed application programming interface (API). The bot is provisioned as a user on the UC server. Thus, different UC systems have to implement their own bot applications. In one case, a corporation or business that employs a different UC system may desire to implement the same bot application to carry out similar tasks. However this is typically impossible due to incompatibilities between the two UC systems.

SUMMARY

An automation platform for a hub-based system federating disparate unified communications systems is herein disclosed. According to one embodiment, the method includes connecting a first unified communications system supporting a first domain and an automation platform to a federation server, where the automation platform includes a plurality of automated applications that includes a social media automated application, an instant messaging automated application and a directory search automated application. The method further includes routing a message from the first unified communications system to an automated application of the plurality of automated applications, processing the message by the automated application, and issuing a command based on the processed message.

The above and other preferred features, including various novel details of implementation and combination of events, will now be more particularly described with reference to the accompanying figures and pointed out in the claims. It will be understood that the particular methods described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying figures, which are included as part of the present specification, illustrate the presently preferred embodiments of the present invention and together with the general description given above and the detailed description of the preferred embodiments given below serve to explain and teach the principles of the present invention.

DETAILED DESCRIPTION

Figure 1:
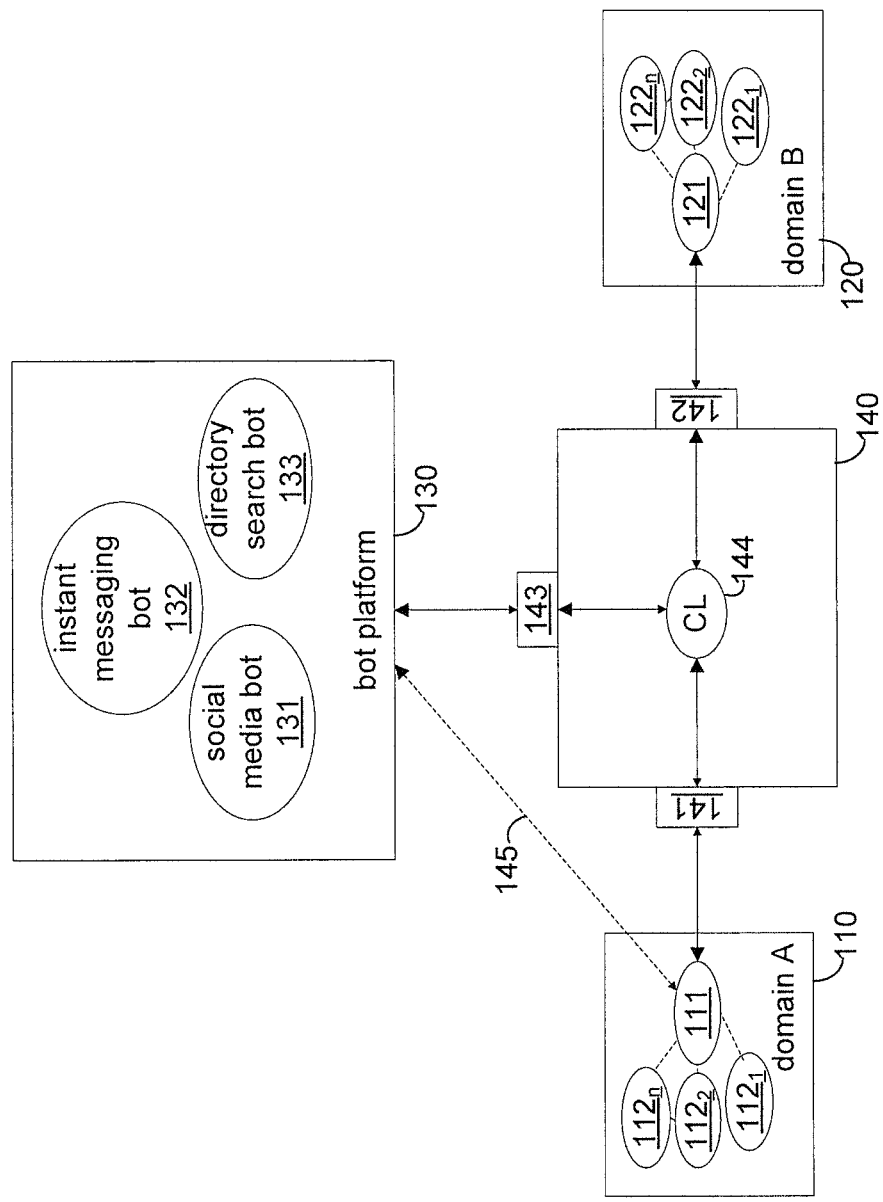
FIG. 1 illustrates a block diagram of an exemplary system for implementing an automation platform (herein referred to as a bot platform) with interconnecting UC systems through a hub, according to one embodiment.

An automation platform for a hub-based system federating disparate unified communications systems is herein disclosed. According to one embodiment, the method includes connecting a first unified communications system supporting a first domain and an automation platform to a federation server, where the automation platform includes a plurality of automated applications that includes comprising a social media automated application, an instant messaging automated application and a directory search automated application. The method further includes routing a message from the first unified communications system to an automated application of the plurality of automated applications, processing the message by the automated application, and issuing a command based on the processed message.

Each of the features and teachings disclosed herein can be utilized separately or in conjunction with other features and teachings to provide a system and method for an automation platform for federation with a hub-based system federating disparate unified communications systems. Representative examples utilizing many of these additional features and teachings, both separately and in combination, are described in further detail with reference to the attached figures. This detailed description is merely intended to teach a person of skill in the art further details for practicing preferred aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

FIG. 1 illustrates a block diagram of an exemplary system for implementing a bot platform with interconnecting UC systems, according to one embodiment. While FIG. 1 only illustrates interconnecting two UC systems 111 and 121, the present system is highly scalable and can interconnect and support any number of UC systems. Each UC system supports a different domain and is accessible (e.g., instant messaging, emailing, voice/video chats, presence, file sharing and video conferencing) by its respective set of users in the domain. As such, users $112_1$-$112_i$ in domain A 110 can communicate with one another through UC system 111. Similarly, users $121_1$-$121_i$ in domain B 120 can access UC system 121 to communicate with other users in the same domain. Because a user generally interacts with a UC system through a user client device (referred herein as client), the terms, user and client, are used interchangeably in this disclosure.

The exemplary system of FIG. 1 employs a hub 140 that includes three connectors three connectors 141-143. Connectors 141 and 142 communicate with UC systems 111 and 121 respectively. Each connector can support any number of UC systems as long as the connector and the UC systems utilize or speak the same protocol (e.g., Session Initiation Protocol (SIP) and Extensible Messaging and Presence Protocol (XMPP)) and are within reach of one another in terms of network connectivity. Connector 143 communicates with bot platform 130. Bot platform 130 contains a variety of bot applications including a social media bot 131, an instant messaging bot 132, and a directory search bot 133.

Hub 140 acts as a central station for translating incoming data from UC systems 111 and 121 and bot platform 130 into a common language (CL) 144. Depending on the UC application implemented on the UC systems 111 and 121, and bot platform 130, CL 144 is translated into a protocol that is supported by the UC systems and bot platform. For instance, a message that is transmitted by UC system 111 and intended for UC system 121 is transmitted to hub 140 via connector 141. The message is then translated by hub 140 into CL 144. Because the message is intended for UC system 121, CL 144 is then translated into a protocol that is recognized by the UC application implemented by UC system 121 and transmitted to UC system 121 via connector 142.

Similarly, a message that is transmitted by UC system 111 and intended for bot platform 130 is transmitted to hub 140 via connector 141 and translated into CL 144. CL 144 is then translated into a protocol that is recognized by bot platform 130 (e.g., Extensible Messaging and Presence Protocol (XMPP)) and transmitted to bot platform 130 via connector 143. In the case where UC system 111 and bot platform 130 are running a common protocol, no translation is required, and UC system 111 routes a message directly to bot platform 130, as indicated by the perforated arrow line 145.

According to one embodiment, hub 140 performs direct translation for communication between UC systems 111 and 121, and bot platform 130 without translating the message into CL 144. Direct translation may be used to achieve higher efficiency and to maintain high fidelity communications.

According to one embodiment, the bot platform for the present system uses Extensible Messaging and Presence Protocol (XMPP). However, it is understood that the bot platform may be based on any communications protocol known to one ordinary skilled in the art.

Before a client in a UC system issues commands to a bot in the bot platform, communication must be established between the UC system and the hub by connecting the UC system to the hub, otherwise known as domain provisioning. Furthermore, if a client in an originating UC system issues commands to a bot that is directed to a destination UC system, communication among the originating and destination UC systems must be established by federating the originating and destination UC systems that are already provisioned with the hub. The local domain administrators of the UC systems need to properly configure their systems so that communication traffic intended from the originating UC system to the destination UC system is directed to the hub. For instance, in a clearinghouse or hub implementation, a domain gateway is implemented. The domain gateway is a component that allows UC systems to communicate with the hub. In order for a UC system to communicate with the hub, both the domain gateway and the UC system need to be configured properly.

Figure 2:
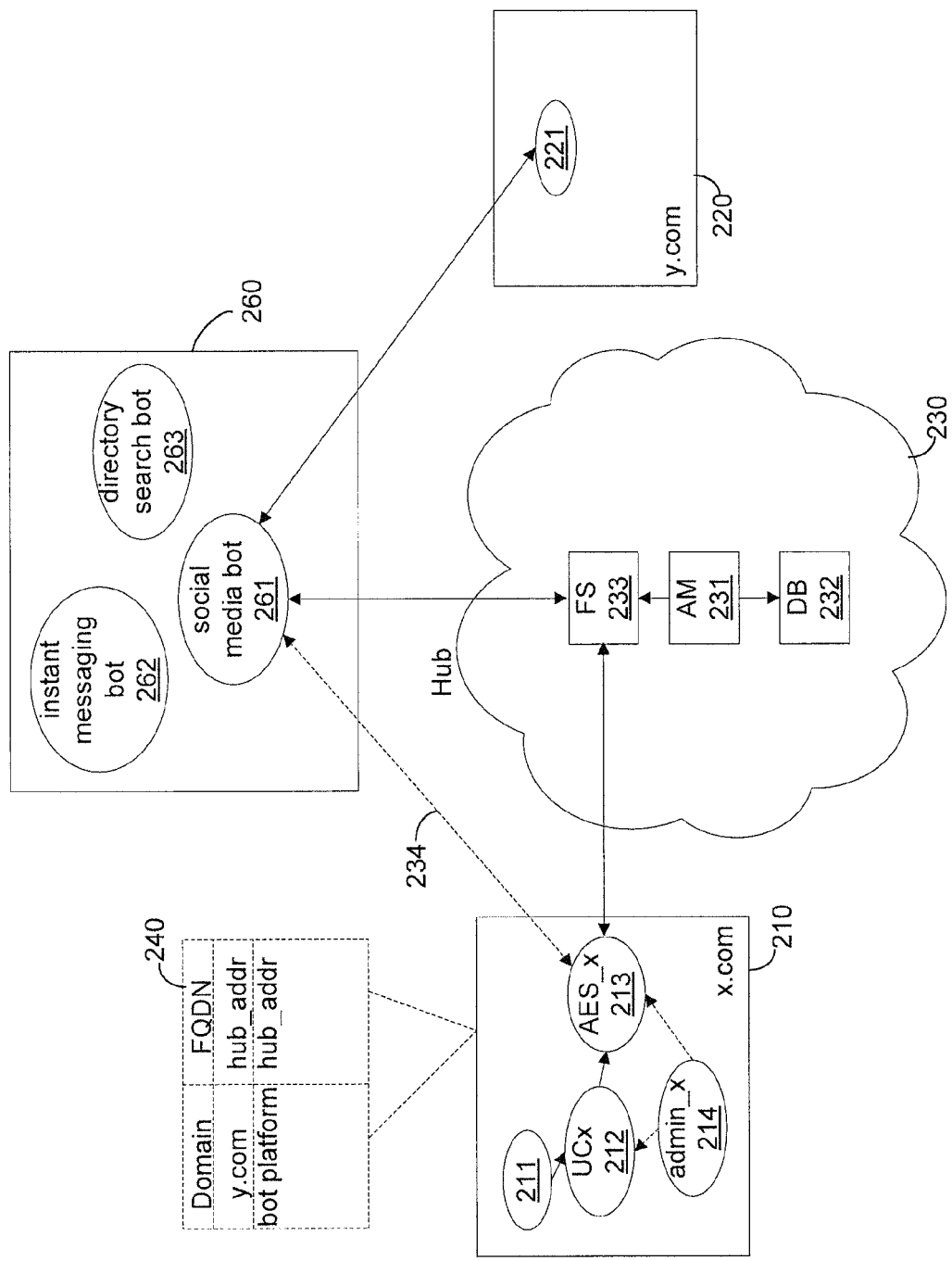
FIG. 2 illustrates a block diagram of an exemplary communication between a user in a domain and a bot through a hub, according to one embodiment.

FIG. 2 illustrates a block diagram of an exemplary communication between a user in a domain and a social media bot, according to one embodiment. Assume that user 211 wishes to post an update to his corresponding user account 221 in a domain y.com 220 by communicating with a social media bot 261 in bot platform 260. The domain y.com 220 may be a social network (e.g., YAMMER®, CHATTER®, TWITTER®). Bot platform 260 contains a variety of bots including a social media bot 261, an instant messaging bot 262 and a directory search bot 263. The bots in bot platform 260 have user or chat addresses that provide a chat endpoint for communication between the bots and user 211. User 211 issues a command to the social media bot 261 to post an update to the receiving domain y.com 220.

User 211 of domain x.com 210 sends a message to its local UC system 212. The message is forwarded to domain gateway 213 (e.g., Access Edge Server (AES), Sametime Gateway) which maintains an allow list 240 of domains that the local domain administrator 214 of domain x.com 210 has allowed its users to have access to.

In order to route communications traffic that is intended for domain y.com 220 to the hub 230, the allow list 240, specifically the fully qualified domain name (FQDN) field in the entry for domain y.com 220, needs to include the address of the hub 230 ("hub_addr"). The allow list 240 includes domains that the local domain administrator 214 has allowed its users to have access to. The allow list 240 also includes the entry of bot platform 260 so that communications traffic can be routed to bot platform 260 from domain x.com 210 through the hub 230. Furthermore, hub 230 must be properly configured by a hub administrator, who must add domain x.com 210 to the hub 230 through administration module (AM) 231. AM 231 is a software program that allows the hub system administrator to configure the hub to grant UC systems with access to hub 230. The hub administrator configures AM 231 and AM 231 updates the data store in a database (DB) 232. Bot platform 260 is configured to federate with hub 230, so it is usable by any UC system that has federated with hub 230. Hub 230 is ready for use and all traffic between domain x.com 210 and bot platform 260 will flow through hub 230.

The domain gateway 213 forwards the message to the federation server (FS) 233 in hub 230. After the message is processed by hub 230, the message is forwarded to the social media bot 261 in bot platform 260. The social media bot 261 further processes and forwards the message through the hub 230 to receiving domain y.com 220 so that an update is posted to the corresponding user account 221.

According to one embodiment, if UC system 212 and bat platform 260 are running a common protocol, no translation is required, and the message is routed directly from domain gateway 213 to the social media bot 261, as indicated by the perforated arrow line 234.

According to one embodiment, a user may carry out a voice call with a bot and issue voice commands based on speech recognition. For instance, a user carries out a voice call with another user of a community (e.g., SKYPE®) by communicating with a bot.

Figure 3A:
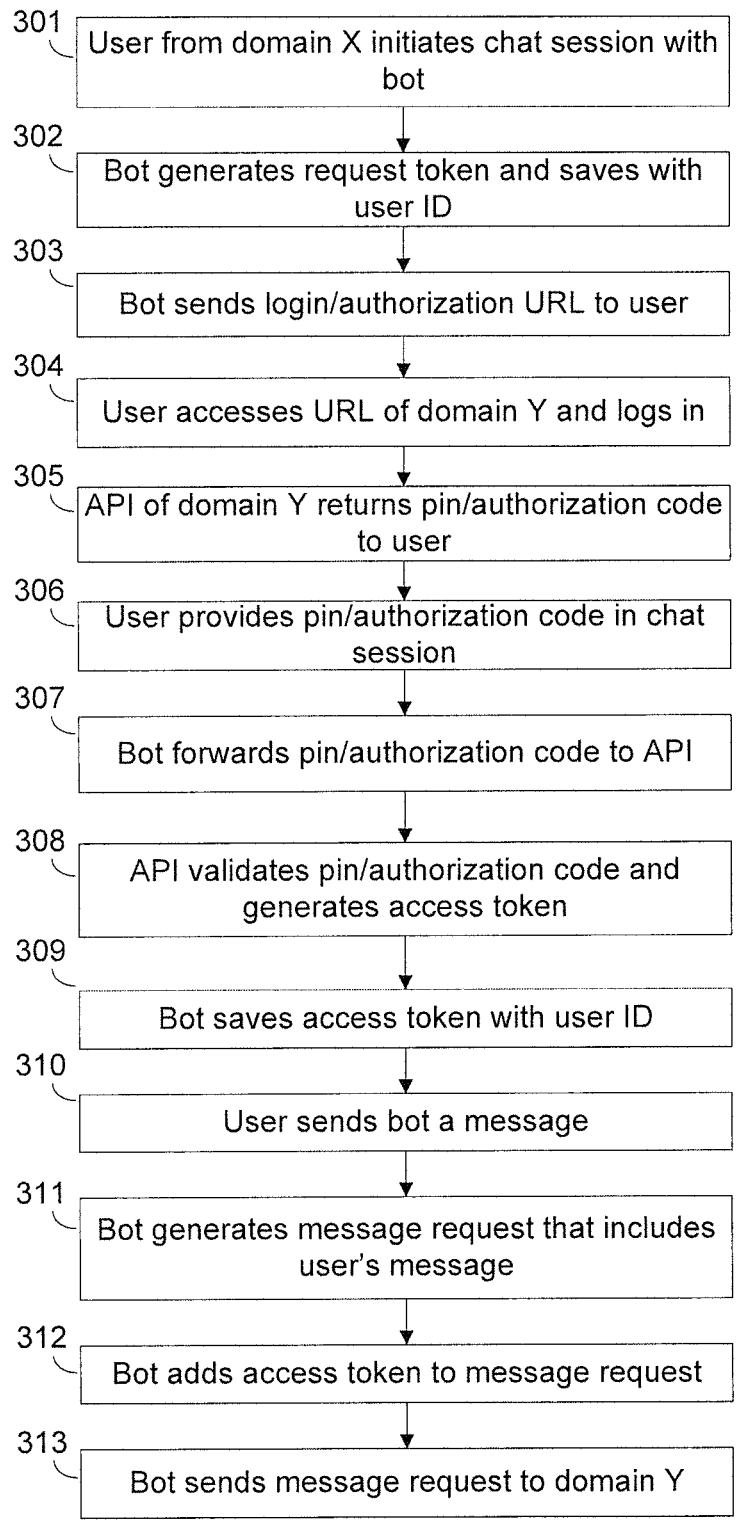
FIG. 3(a) illustrates a flow chart of an exemplary process for a social media bot using token-based authentication, according to one embodiment.

FIG. 3(a) illustrates a flow chart of an exemplary process for a social media bot using token-based authentication, according to one embodiment. Assume that a user from an originating domain X of a UC system wishes to post an update to his/her corresponding user account in destination domain Y (e.g., YAMMER®) by communicating with a social media bot. The user from domain X initiates a chat session with the social media bot (at 301). The user adds a chat address of the social media bot to his contact list and types an initial greeting (e.g., login, join and hello) to the social media bot. The social media bot generates a request token and saves the request token with the user ID (at 302). The bot sends a login/authorization URL of domain Y to the user (at 303). The user accesses the login/authorization URL of domain Y and logs in with a user ID and password for domain Y (at 304). According to one embodiment, the user accesses the login/authorization URL using a browser. The API of domain Y returns a pin/authorization code to the user (at 305). According to one embodiment, the API is a representational state transfer (REST) type of interface. The user provides the pin/authorization code in the chat session to the social media bot (at 306). The social media bot forwards the pin/authorization code to the API (at 307). The API validates the pin/authorization code and generates an access token for the user (at 308). The social media bot saves the access token together with the user ID (at 309). Once the authorization is successfully executed, the social media bot becomes an authorized application to access domain Y on behalf of the user.

The user proceeds to send the social media a message for posting as an update in domain Y (at 310). For instance, the user may type a command:

Post "hello this is Peter"

The social media bot generates a message request that includes the user's message (at 311). The social media bot adds the access token to the message request (at 312) and sends the message request to domain Y (at 313). The user-typed message "hello this is Peter" is posted as the user's account on domain Y.

According to one embodiment, the message request includes various forms of requests, including but not limited to, post, read and delete a post on the user's corresponding account or on the accounts of a desired group of users in domain Y. For instance, the user may post an update to a group called "Sales and Marketing" in domain Y. The user types a command in the chat session with the social media bot:

Post-group "Sales and Marketing" "hello this is Peter"

With this command, the string "hello this is Peter" is posted to the group "Sales and Marketing" on domain Y. The structure of commands issued by the user may vary based on the user-friendliness of the commands and/or experience level and preference of the user.

Figure 3B:
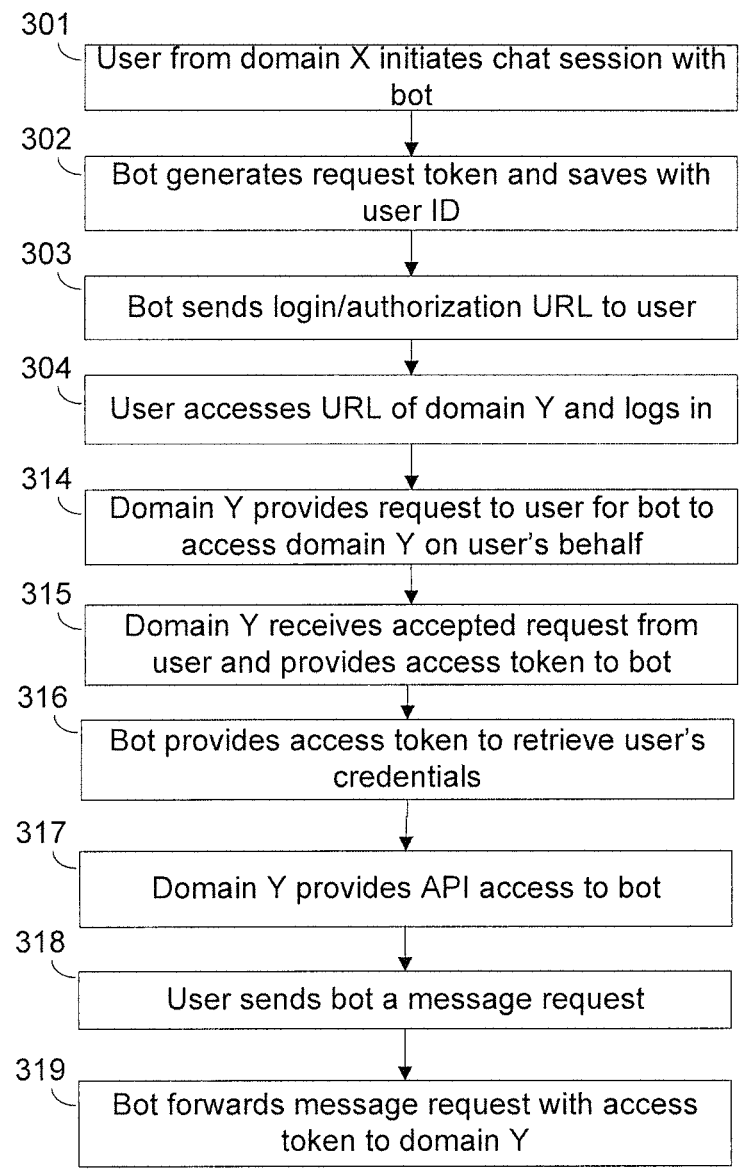
FIG. 3(b) illustrates another flow chart of an exemplary process for a social media bot using token-based authentication, according to one embodiment.

FIG. 3(*b*) illustrates another flow chart of an exemplary process for a social media bot using token-based authentication, according to one embodiment. Assume that a user from an originating domain X of a UC system wishes to post an update to his/her corresponding user account in destination domain Y (e.g., YAMMER®) by communicating with a social media bot. The user from domain X initiates a chat session with the social media bot (at 301). The user adds a chat address of the social media bot to his contact list and types an initial greeting (e.g., login, join and hello) to the social media bot. The social media bot generates a request token and saves the request token with the user ID (at 302). The bot sends a login/authorization URL of domain Y to the user (at 303). The user accesses the login/authorization URL of domain Y and logs in with a user ID and password (at 304). In this case, the bot does not have access to the user's password. Domain Y provides a request to the user via a browser for the bot to access domain Y on the user's behalf (at 314). Domain Y receives the accepted request from the user and provides an access token to the bot (at 315). The bot provides the access token to retrieve the user's credentials (at 316). The access token allows the bot to access domain Y on the user's behalf. Domain Y provides API access to the bot (at 317). The user sends the social media bot a message request (at 318). The social media bot forwards the message request together with the access token to domain Y (at 319).

The following commands or message requests illustrate exemplary syntax that may be used by a user in a chat session with the bot:
1. Join—Authenticates a user with the destination domain
2. Post <message>—Posts a message to the user's corresponding account on the destination domain
3. #<group name>:<message>—Posts a message to a group or topic on the destination domain
4. @<user name>:<message>—Sends a private message to a user in the destination domain
5. @<user name1>, <user name2>:<message>—Sends a private message to a plurality of users in the destination domain
6. Reset—Removes a user's credentials (authentication) with the destination domain
7. Help—Displays help information Referring to FIG. 2, bot platform 260 includes a directory search bot 263 for searching user directory 250 containing user information (e.g., email address, job title, department, phone number, and address) of users in domains that are federated with hub 230, according to one embodiment. User 211 creates a chat session with the directory search bot 263 and makes a request to perform a search in user directory 250. Similarly, the directory search bot 263 authenticates with user directory 250 as an authorized application on behalf of user 211 by requesting user 211 to login with a user name (e.g., email address) and a password at a web interface tool of user directory 250. In one embodiment, if user 211 has been authenticated with UC system 212, the directory search bot 263 obtains authorization information for user 211 directly from user directory 250.

According to one embodiment, the present system allows a bot to support communications with domains that do not federate with the hub. This includes domains that use proprietary protocol and do not have a federation gateway. The bot may communicate with the destination domain by making use of the destination domain's API and runtime programs supplied by the destinations domain.

Figure 4:
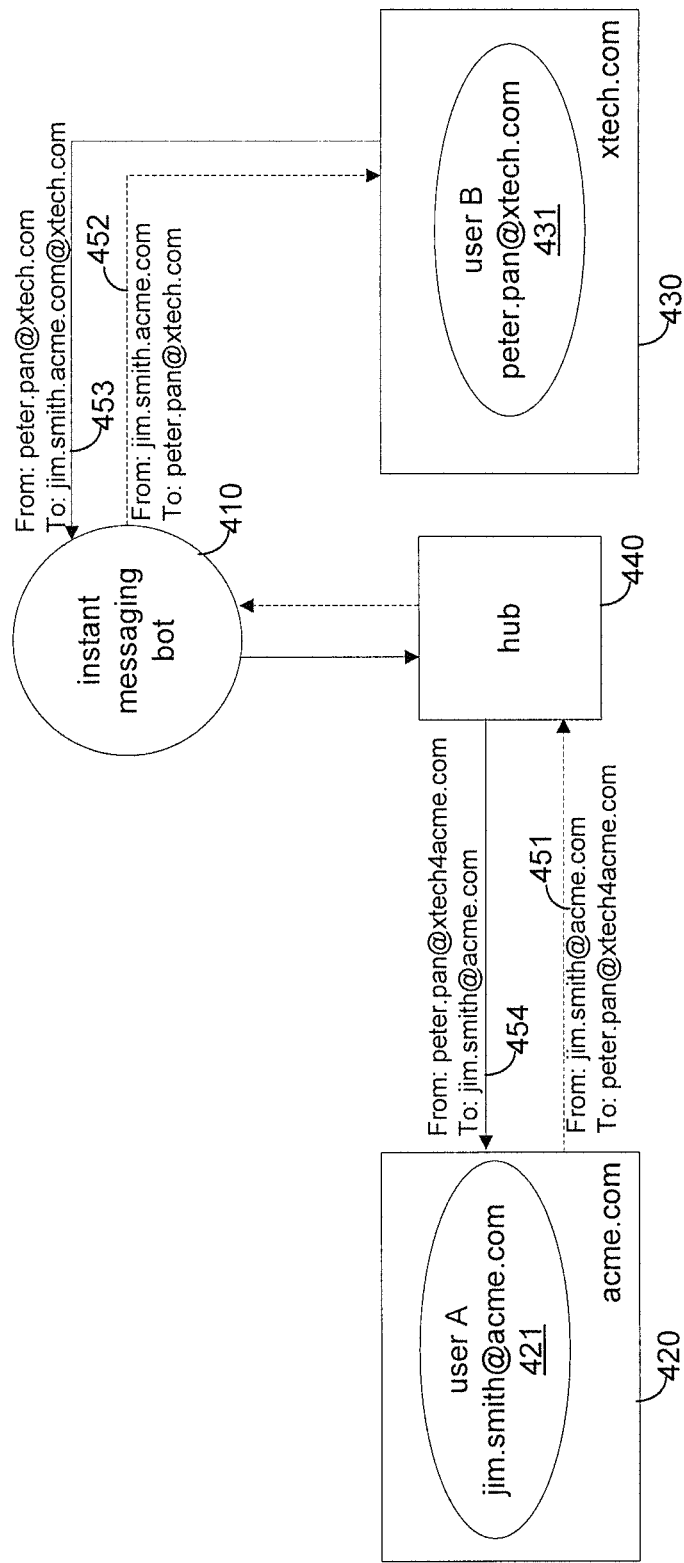
FIG. 4 illustrates a block diagram of an exemplary communication between a bot and a domain that does not support federation with a hub, according to one embodiment.

FIG. 4 illustrates a block diagram of an exemplary communication between a bot and a domain that does not support federation with a hub, according to one embodiment. User A 421 from domain acme.com 420 has a user address jim.smith@acme.com. The domain acme.com 420 supports federation with hub 440 and has been properly configured to federate with hub 440. Domain X may be supported by UC systems for presence and instant messaging including MICROSOFT LYNC®, CISCO JABBER®, JABBER XCP®, IBM®SAMETIME®, and GOGGLE APPS®. Domain X may further support UC systems for voice services including MICROSOFT LYNC®, and GOOGLE®.

User B 431 from domain xtech.com 430 has a user address peter.pan@xtech.com. However domain xtech.com 430 is supported by a UC system that does not support federation with hub 440 (e.g., due to proprietary protocol). Domain xtech.com 430 may be an instant messaging (IM) network (e.g., SKYPE®, YAHOO® and AOL®), according to one embodiment. User A 421 provides a contact add request to add user B 431's contact to his/her contact list. User A 421 adds user B's 431 contact to his contact list using a proxy address for user B 431, for instance, peter.pan@xtech4acme.com. Bot 410 processes the contact add request and understands that the request is coming from user A 421 jim.smith@acme.com and the request is intended to add the contact peter.pan@xtech.com. The user name peter.pan for user B 431 is based on user B's user name in domain xtech.com 430. The domain xtech4acme.com is a proxy domain specific for domain acme.com 420 or any proxy domain hosted by hub 440.

Bot 410 maps user A's 421 user address jim.smith@acme.com to a new user ID that is recognized by domain xtech.com 431, for instance, jim.smith.acme.com. According to one embodiment, bot 410 maps a user address by replacing "@" with ".". Bot 410 authenticates into domain xtech.com 431 on behalf of user A 421 using the new user ID jim.smith.acme.com. The bot 410 forwards the contact add request to user B 431 in domain xtech.com 430. User B 431 in domain xtech.com 430 receives the contact add request as if it comes from the mapped user address jim.smith.acme.com of user A 421.

Figure 5:
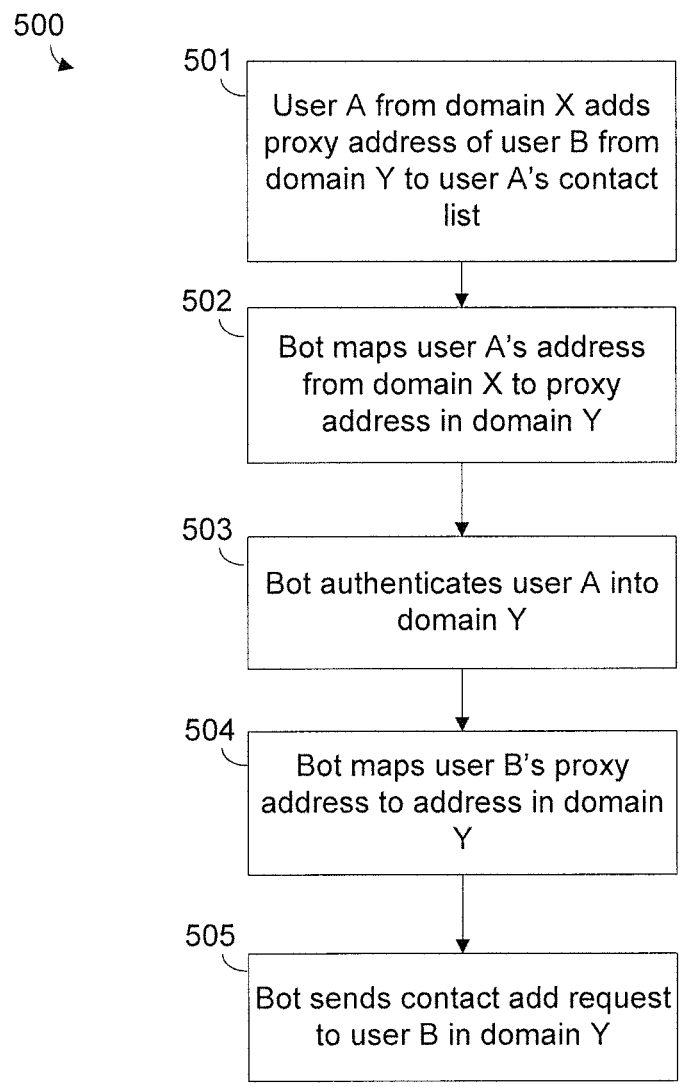
FIG. 5 illustrates a flow chart of an exemplary process for adding a user contact using a bot of the present system, according to one embodiment.

FIG. 5 illustrates a flow chart of an exemplary process for adding a user contact of a domain that does not support federation with a hub of the present system, according to one embodiment. User A from domain X adds a proxy address of user B from domain Y to user A's contact list (at 501). For instance, referring to FIG. 4, user A 421 has an address jim.smith@acme.com from domain acme.com 420. Domain acme.com 420 has been configured to federate with a hub 440. Domain X may support UC systems for presence and instant messaging including MICROSOFT LYNC®, CISCO JABBER®, JABBER XCP®, IBM® SAMETIME®, and GOGGLE APPS®. Domain X may further support UC systems for voice services including MICROSOFT LYNC®, and GOOGLE®. Domain Y is a UC system that does not support federation with a hub. Referring to FIG. 4, user B 431 has an address peter.pan@xtech.com from domain xtech.com 430. User A 421 may then add a proxy address of user B to be peter.pan@xtech4acme.com as indicated by the dotted arrow 451. The domain xtech4acme.com is a proxy domain (or any number of other domains) to federate with domain Y. The bot supports more than one domain as a proxy domain because of federation complexities in various use cases and the requirement to support demos, proof of concept (POC), testing and production using a single bot. By providing a number of domains as proxy domains, a domain can federate with any of the proxy domains. For instance, if a domain X1 cannot federate with the proxy domain xtech4acme.com, it can federate with a different proxy domain such as xtech.proxydomain.net.

The bot maps user A's address from domain X to user A's proxy address in domain Y (at 502). For instance, referring to FIG. 4, bot 410 maps user A's 421 account from domain acme.com 420 to domain xtech.com 430. If user A 421 has an account in domain xtech.com 430 with a user address jim.smith.acme.com@xtech.com, bot 410 derives the user address jim.smith.acme.com@xtech.com from the user address jim.smith@acme.com in domain acme.com 420 by replacing "@" with ".". However, if user A has an existing account in domain xtech.com that cannot be derived from domain acme.com, for instance james.t.smith@xtech.com, then the bot requires a user list as part of configuration data to map jim.smith@acme.com to james.t.smith@xtech.com. Thus, a mapping entry is required for direct mapping from jim.smith@acme.com to james.t.smith@xtech.com.

The bot authenticates user A into domain Y (at 503). The bot may log into domain Y on behalf of user A. According to one embodiment, the bot authenticates into domain Y using a client level API (i.e., third party API) provided by domain Y. The bot may make use of a default password configured for the bot to log into domain Y, according to one embodiment.

The bot maps user B's proxy address to user B's address in domain Y (at 504). For instance, referring to FIG. 4, bot 410 maps the user address for user B 431 from peter.pan@xtech4acme.com to peter.pan@xtech.com in domain xtech.com 430 as indicated by the dotted arrow 452. The bot sends the contact add request to user B in domain Y (at 505). If user B accepts the contact add request, user B is successfully added as a contact to user A's contact list. Once user B is added to user A's contact list, they may see each other's presence and initiate chats.

Figure 6:
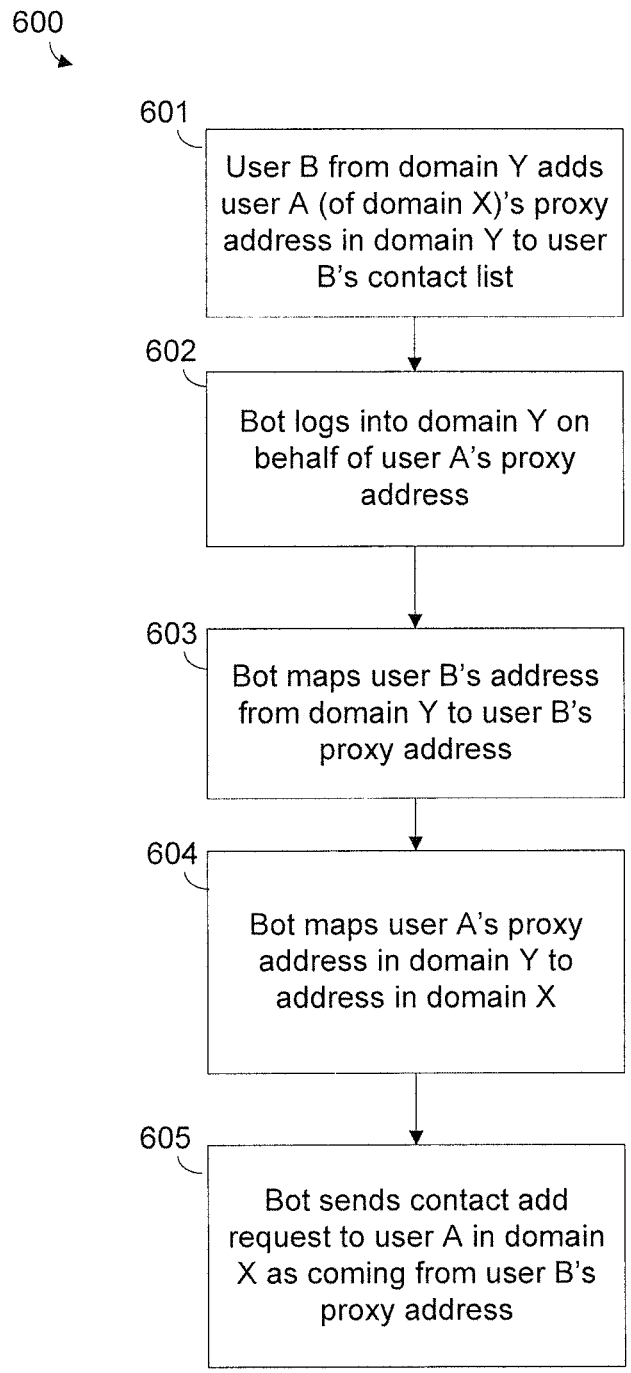
FIG. 6 illustrates a flow chart of another exemplary process for adding a user contact of a domain that does not support federation with a hub of the present system, according to one embodiment.

FIG. 6 illustrates a flow chart of an exemplary process for adding a user contact of a UC system using a bot of the present system, according to one embodiment. User B from domain Y adds user A's proxy address in domain Y to user B's contact list, where user A is from domain X (at 601). In this case, domain Y is supported by a UC system that does not support federation with the hub. For instance, referring to FIG. 4, user B peter.pan@xtech.com adds user A's proxy address jim.smith.acme.com@xtech.com to his contact list as indicated by the arrow 453. The bot logs into domain Y on behalf of user A's proxy address in domain Y (at 602). The bot maps user's B address from domain Y to a proxy address in a proxy domain (at 603). For instance, referring to FIG. 4, bot 410 maps user B 431's address from peter.pan@xtech.com to peter.pan@xtech4acme.com using the proxy domain xtech4acme.com. The bot further maps user A's proxy address in domain Y to user A's address in domain X (at 604). For instance, referring to FIG. 4, bot 410 maps user A 421's proxy address jim.smith.acme.com@xtech.com to jim.smith@acme.com. Various methods of mapping may be implemented, as described above. The bot sends the contact add request to user A in domain X as if it comes from user B's proxy address (at 605). For instance, referring to FIG. 4, bot 410 translates the contact add request into a subscribe message to be sent to user A 421 jim.smith@acme.com as if it comes from the proxy address peter.pan@xtech4acme.com as indicated by the arrow 454. The subscribe message may be in XMPP protocol, or any other communications protocol. According to one embodiment, the bot authenticates user A into domain Y before the bot sends the contact add request to user A at 605. If user A accepts the contact add request, user A is successfully added as a contact to user B's contact list. Once user A is added to user B's contact list, they may see each other's presence and initiate chats.

Figure 7:
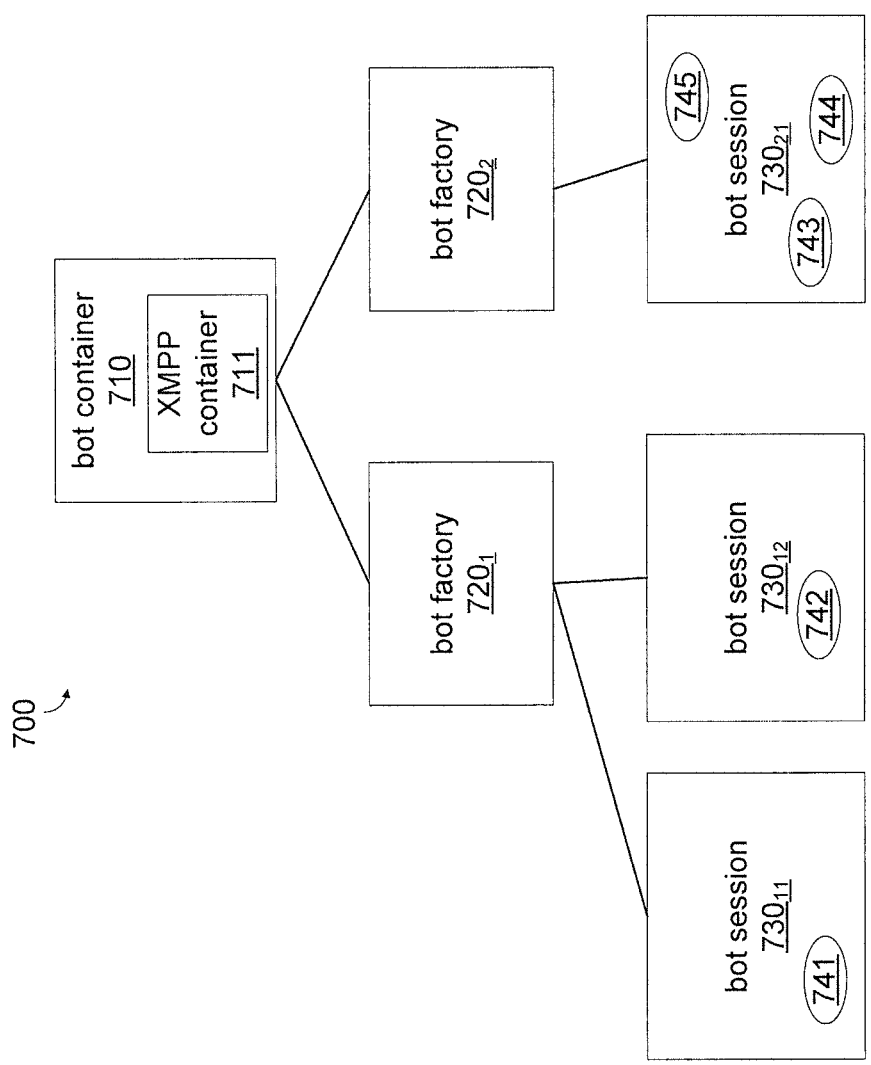
FIG. 7 illustrates a block diagram of an exemplary bot platform, according to one embodiment.

FIG. 7 illustrates a block diagram of an exemplary bot platform, according to one embodiment. Bot platform 700 includes bot container 710, which provides services that a bot requires, including database and web servlets. According to one embodiment, bot container 710 includes an XMPP container 711 that handles XMPP communication traffic between the bot container 710 and a hub. The XMPP container may also handle direct XMPP communication traffic directly between the bot container 710 and any XMPP UC system. In another embodiment, bot container 710 may contain an SIP container 711 if communication traffic between the bot container 710 and a hub uses SIP protocol.

Bot container 710 creates a plurality of bot factories 720 based on the various types of bots. Typically, bot container 710 instantiates one bot factory for every bot function (e.g., social media bot) that is requested by a user from a UC system through a hub. Bot container 710 creates a bot factory based on the bot chat address. Although FIG. 7 illustrates only two bot factories, the bot container 710 of the present system may instantiate any number of bot factories. A bot factory may have multiple bot chat addresses pointing to the same bot function.

For instance, when a user peter@x.com 741 from a domain x.com creates a chat session with a social media bot, the user sends a message (e.g., an XMPP packet) from the domain x.com to the bot through a hub. Bot container 710 instantiates a bot factory $720_1$ for the social media bot. The bot factory $720_1$ instantiates a bot session $730_{11}$ for user peter@x.com 741 based on the user's address, i.e., peter@x.com. Incoming messages from user peter@x.com 741 to the social media bot are directed into the bot session $730_{11}$. Each bot factory 720 representing a bot instance creates a bot session 730 for every user that communicates with the bot instance. For instance, the bot factory $720_1$ creates two separate bot sessions $730_{11}$ and $730_{12}$ for users 741 and 742 respectively. According to one embodiment, a bot factory 720 chooses to maintain one bot session for multiple users when a history or memory of the chat session is not required. For instance, the bot factory $720_2$ creates one bot session $730_{21}$ for multiple users 743-745. Bot container 710 provides its own reference into the bot sessions 730, which is used by the bot sessions 730 for sending messages. For instance, the reference points to a Java object if the implementation is in Java. Based on the reference, each bot session 730 can use common services of bot container 710 (e.g., an XMPP packet send function, a database and a web server).

According to one embodiment, bot container 710 queries the bot session 730 on whether or not the bot session 730 should end. Bot container 710 may automatically end the bot session 730 if it has been inactive for a certain length of time. The bot session 730 may further send a message to inform the user that the chat session is ending.

Figure 8:
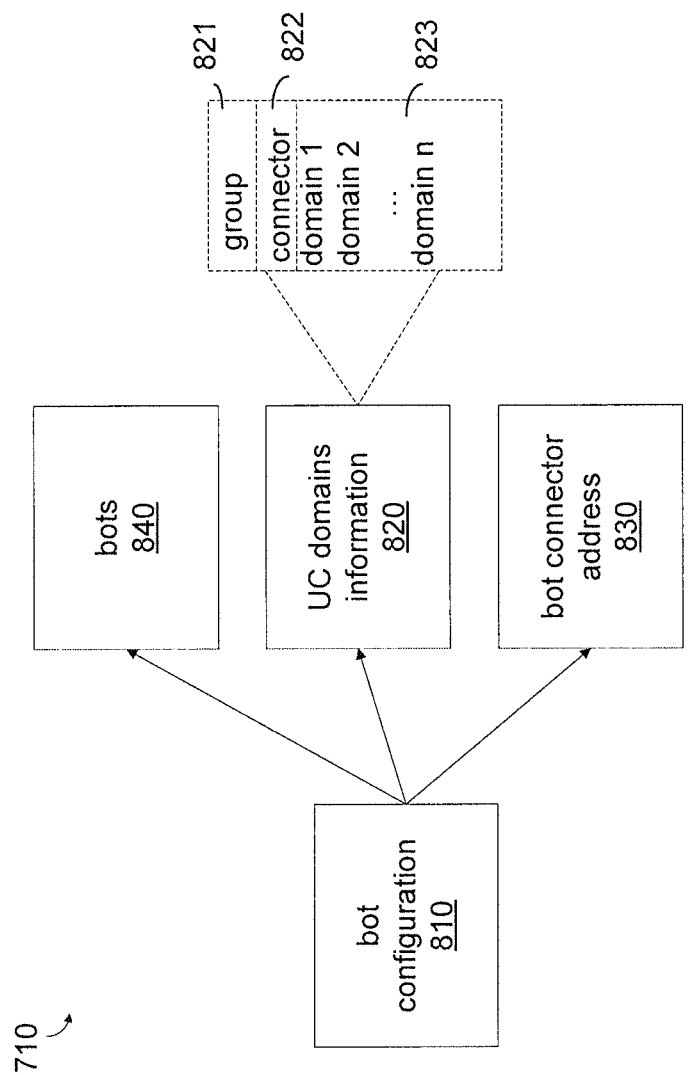
FIG. 8 illustrates a block diagram of an exemplary configuration for a bot container, according to one embodiment.

FIG. 8 illustrates a block diagram of an exemplary configuration for a bot container, according to one embodiment. The bot configuration 810 of bot container 710 includes a bot connector address 830 that defines the IP address and port of the connector communicating between the hub 140 and the bot platform 130. For instance, referring to FIG. 1, when a user 112 from domain A 110 sends a message to a bot, the message is routed to the connector address 830 of the associated bot through the hub 140. According to one embodiment, the bot configuration is represented by an extensible markup language (XML) file.

The bot configuration 810 includes UC domains information 820 for UC systems that communicate with a bot. For instance, referring to FIG. 1, if a user 112 from domain A 110 wishes to communicate with a bot, then the bot needs to establish a communication with domain A 110. The bot configuration 810 includes a top level element called UC domains information 820. The domains element 820 contains group 821. According to one embodiment, the present system includes a plurality of hubs using the bot, and each hub is referred to as a hub instance. The group 821 typically represents a hub instance from a plurality of hubs using the bot. While FIG. 8 illustrates only one group 821, the domains element 820 may contain a plurality of groups without deviating from the scope of the present system and method. The group 821 contains group information elements about the group 821. The group information elements include connector information 822 (e.g., XMPP) defined by FQDN, IP address, and port. The group information elements further includes one or more domain names 823 (e.g., domain 1, domain 2 ... domain n) that belong to the group 821. According to one embodiment, when all domains belong to a group 821, the domain name 823 may be represented by a "*" in the XML file. The multiple groups allow a single bot container 810 to be used with a plurality of groups 821 for multiple hub instances, as long as each group in the plurality groups 821 are correctly configured with domain names 823 and point to a corresponding hub instance. The bot container configuration 810 includes all the bots 840 that are loaded by the bot container. Each bot 840 may contain multiple bot addresses for communication with users from various domains provided that these domains are properly configured in the hub so that messages (e.g., XMPP packets) are routed or sent to the bot.

Figure 9:
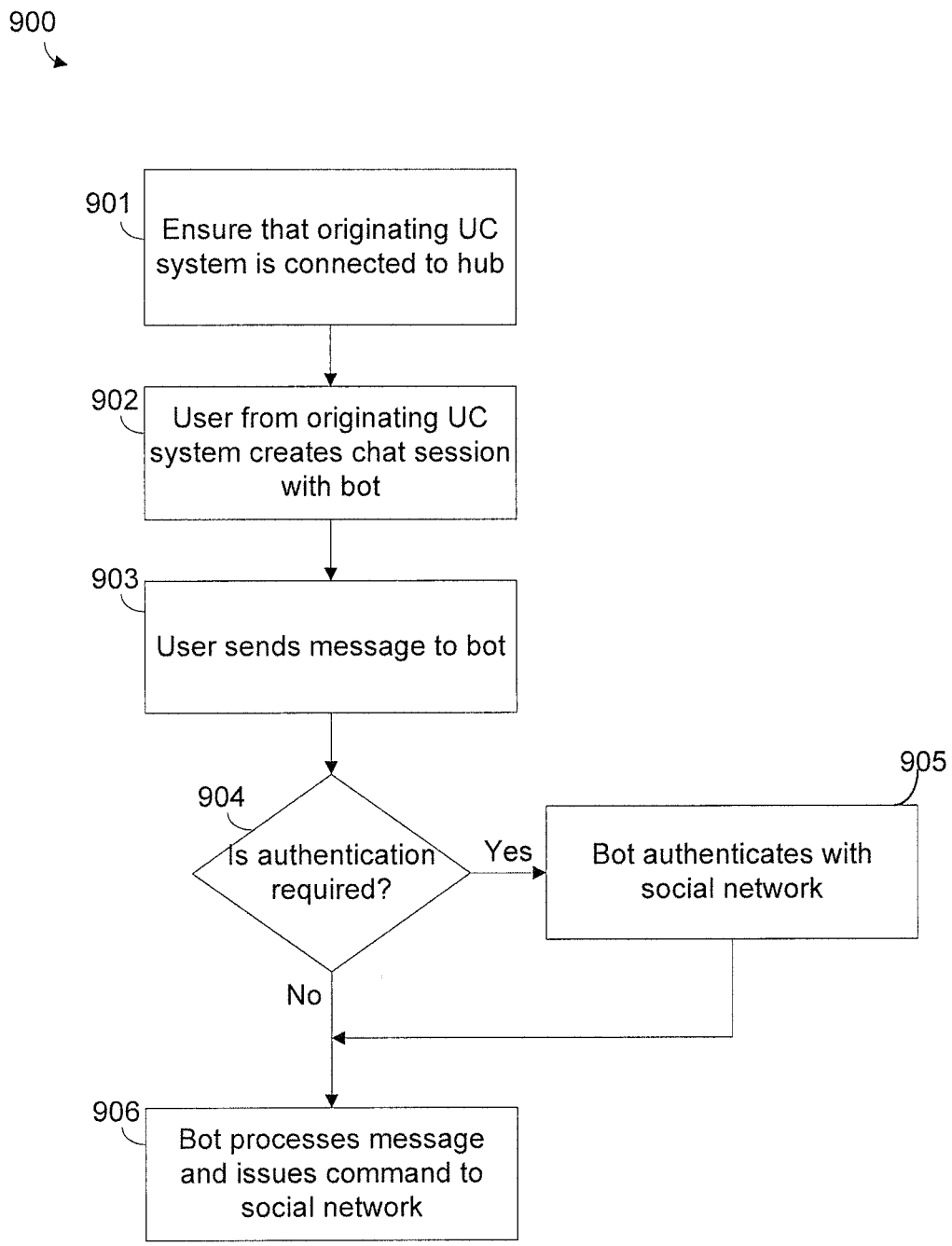
FIG. 9 illustrates a flow chart of an exemplary process for issuing a command by using a bot of the present system, according to one embodiment.

FIG. 9 illustrates a flow chart of an exemplary process for issuing a command by using a bot of the present system, according to one embodiment. The process 900 begins with ensuring that both an originating UC system is connected to a hub (at 901). A user from the originating UC system creates a chat session with a bot using a bot address in his contact list (at 902). The user sends a message to the bot in the chat session (at 903). The message includes a command to a social network. If authentication with the social network is required (at 904), the bot authenticates with the social network on behalf of the user (at 905). Otherwise, the bot processes the message and issues a command to the social network for the user (at 906).

Figure 10:
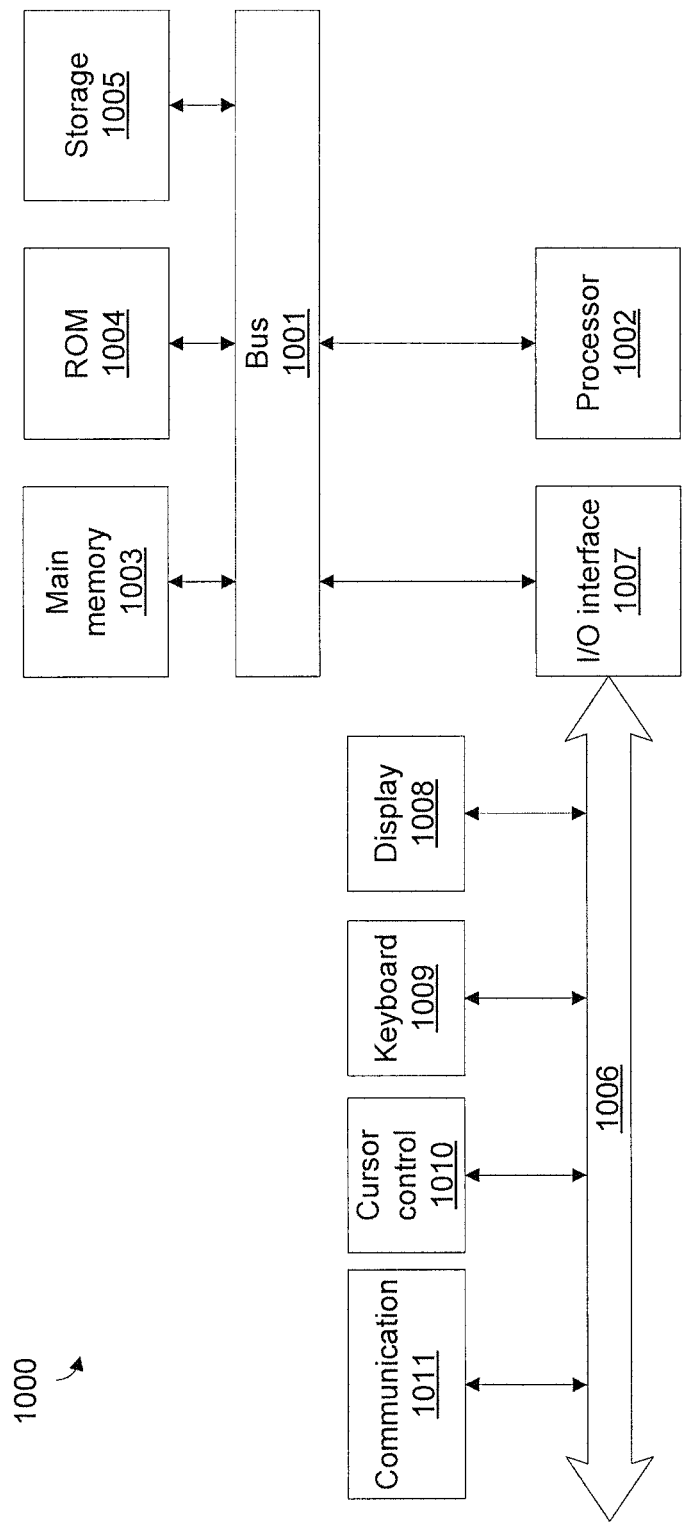
FIG. 10 illustrates an exemplary computer architecture that may be used for the present system, according to one embodiment.

FIG. 10 illustrates an exemplary computer architecture that may be used for the present system, according to one embodiment. The exemplary computer architecture may be used for implementing one or more components described in the present disclosure including, but not limited to, the present system. One embodiment of architecture 1000 includes a system bus 1001 for communicating information, and a processor 1002 coupled to bus 1001 for processing information. Architecture 1000 further includes a random access memory (RAM) or other dynamic storage device 1003 (referred to herein as main memory), coupled to bus 1001 for storing information and instructions to be executed by processor 1002. Main memory 1003 also may be used for storing temporary variables or other intermediate information during execution of instructions by processor 1002. Architecture 1000 may also include a read only memory (ROM) and/or other static storage device 1004 coupled to bus 1001 for storing static information and instructions used by processor 1002.

A data storage device 1005 such as a magnetic disk or optical disc and its corresponding drive may also be coupled to architecture 1000 for storing information and instructions. Architecture 1000 can also be coupled to a second I/O bus 1006 via an I/O interface 1007. A plurality of I/O devices may be coupled to I/O bus 1006, including a display device 1008, an input device (e.g., an alphanumeric input device 1009 and/or a cursor control device 1010).

The communication device 1011 allows for access to other computers (e.g., servers or clients) via a network. The communication device 1011 may include one or more modems, network interface cards, wireless network interfaces or other interface devices, such as those used for coupling to Ethernet, token ring, or other types of networks.

The above example embodiments have been described hereinabove to illustrate various embodiments of implementing a bot platform for federation with a hub-based system federating disparate unified communications systems. Various modifications and departures from the disclosed example embodiments will occur to those having ordinary skill in the art. The subject matter that is intended to be within the scope of the invention is set forth in the following claims.

The invention claimed is:

1. A computer-implemented method, comprising:
connecting a first unified communications system supporting a first domain to a federation server through a first connector, connecting an automation platform to the federation server through a second connector, and connecting a second unified communication system supporting a second domain to the federation server through a third connector,
wherein the first unified communications system and the automation platform operate using a common protocol and the common protocol is one of a session initiation protocol (SIP) and an extensible messaging and presence protocol (XMPP), and
wherein the automation platform comprises a plurality of automated applications further comprising a social media automated application, an instant messaging automated application and a directory search automated application;
routing a message from the first unified communications system to an automated application of the plurality of automated applications;

processing the message by the automated application;
issuing a command based on the processed message; and
routing the command from the automated application to the second domain supported by the second unified communications system.

2. The computer-implemented method of claim 1, further comprising providing a first user having a first user address of the first domain with an authentication uniform resource locator (URL) of the second domain by the automated application.

3. The computer-implemented method of claim 2, further comprising providing an access token from the automated application to the second domain to access the second domain on behalf of the first user from the first domain.

4. The computer-implemented method of claim 1, wherein the message comprises a communication for a second user proxy address of a proxy domain of a second user, wherein the second user has a second user address of the second domain, and wherein the proxy domain is connected to the federation server.

5. The computer-implemented method of claim 4, wherein processing the message by the automated application further comprises mapping a first user address of the first domain to a first user proxy address of the second domain.

6. The computer-implemented method of claim 5, wherein processing the message by the automated application further comprises mapping the second user proxy address of the second user to a second user address of the second domain.

7. The computer-implemented method of claim 6, wherein routing the command further comprises sending the communication to the second user address of the second domain as coming from the first user proxy address of the second domain.

8. The computer-implemented method of claim 1, further comprising providing a chat address for the social media automated application.

9. The computer-implemented method of claim 1, further comprising routing the command from the directory search automated application to a user directory server.

10. The computer-implemented method of claim 1, wherein the automation platform comprises one or more of a connector information, a domain information of the first unified communications system, and a federation server information.

11. The computer-implemented method of claim 1, further comprising creating an automated application session to process communication between the automated application and one or more users of the first unified communications system.

12. The computer-implemented method of claim 1, wherein the message comprises an Extensible Messaging and Presence Protocol (XMPP) packet.

13. The computer-implemented method of claim 1, wherein the message is based on speech recognition.

14. A system, comprising:
an automation platform comprising a plurality of automated applications further comprising a social media automated application, an enterprise chat automated application, and a search automated application; and
a federation server that is connected to a first unified communications system supporting a first domain through a first connector, the federation server is connected to the automation platform through a second connector, and the federation server is connected to a second unified communications system supporting a second domain through a third connector,
wherein the first unified communications system and the automation platform operate using a common protocol and the common protocol is one of a session initiation protocol (SIP) and an extensible messaging and presence protocol (XMPP), and
wherein the first united communications system routes a message to an automated application of the plurality of automated applications, and wherein the automated application processes the message to issue a command, and
wherein the automated application routes the command to the second domain supported by the second unified communications system.

15. The system of claim 14, wherein the automated application provides a first user of the first domain from the automated application with an authentication uniform resource locator (URL) of the second domain.

16. The system of claim 15, wherein the automated application provides an access token to the second domain to access the second domain on behalf of the first user of the first domain.

17. The system of claim 14, wherein the message comprises a communication for a second user proxy address of a proxy domain of a second user, wherein the second user has a second user address of the second domain, and wherein the proxy domain is connected to the federation server.

18. The system of claim 17, wherein the automated application processes the message further comprises the automated application maps a first user address of the first domain to a first user proxy address of the second domain.

19. The system of claim 18, wherein the automated application processes the message further comprises the automated application maps the second user proxy address of the second user to a second user address of the second domain.

20. The system of claim 19, wherein the automated application routes the command to a second domain further comprises the automated application sends the communication to the second user address of the second domain as coming from the first user proxy address of the second domain.

21. The system of claim 14, wherein the social media automated application comprises a chat address.

22. The system of claim 14, wherein the directory search automated application routes the command to a user directory server.

23. The system of claim 14, wherein the automation platform comprises one or more of a connector information, a domain information of the first unified communications system, and a federation server information.

24. The system of claim 14, wherein the automation platform creates an automated application session to process communication between the automated application and one or more users of the first unified communications system.

25. The system of claim 14, wherein the message comprises an Extensible Messaging and Presence Protocol (XMPP) packet.

26. The system of claim 14, wherein the message is based on speech recognition.

* * * * *